US005519776A

United States Patent [19]

Kodama

[11] Patent Number: 5,519,776

[45] Date of Patent: May 21, 1996

[54] CORDLESS TELEPHONE WITH BATTERY CHARGER

[75] Inventor: Yukiya Kodama, Higashihiroshima, Japan

[73] Assignee: Sharp Kabushiki Kaisha, Osaka, Japan

[21] Appl. No.: 302,951

[22] Filed: Sep. 12, 1994

[30] Foreign Application Priority Data

Dec. 10, 1993 [JP] Japan .................................... 5-309986

[51] Int. Cl.$^{6}$ ........................................ H04M 1/00

[52] U.S. Cl. ........................ 379/435; 379/436; 379/428

[58] Field of Search ................................ 379/428, 433, 379/434, 435, 436, 58, 61; 455/89, 90, 38.3

[56] References Cited

U.S. PATENT DOCUMENTS 5,151,643 9/1992 Emmert et al. ............................ 455/90

FOREIGN PATENT DOCUMENTS 61-191646 11/1986 Japan .
5-37615 2/1993 Japan .
5-40599 10/1993 Japan .

*Primary Examiner*—Jeffery Hofsass
*Assistant Examiner*—Jack Chiang

[57] ABSTRACT

A cordless telephone set including a first groove and a second groove on each of the side faces of a handset, the first groove having an open end at a front edge of the side face, the second groove having an open end at a rear edge of the side face, a pair of charging terminals at the ends of the first and second grooves opposite the open ends, and conducting terminals on both the inner side surfaces of a charger for charging the handset, the conducting terminals coming into contact with the charging terminals through the open ends of the first or second groove. With this structure, the charger is installable either on a desk or a wall without using a separate member, and charging the handset is available even when the handset is reversibly set on the charger installed on the desk or wall.

3 Claims, 6 Drawing Sheets

PRIOR ART

PRIOR ART

PRIOR ART

CORDLESS TELEPHONE WITH BATTERY CHARGER

FIELD OF THE INVENTION

The present invention relates to a cordless telephone set whose charger is used as either a desktop charger or a wall charger.

BACKGROUND OF THE INVENTION

Referring to FIGS. 5(*a*), 5(*b*), 6(*a*), 6(*b*) and 7, the following description discusses a conventional cordless telephone set having a charger which is used as either a desktop charger or a wall charger and is capable of charging a secondary battery included in a handset when the handset is set in the charger which is put on a desk or wall.

Provided on the front face of a handset 30 of the cordless telephone set including therein a secondary battery are a transmitter section (microphone) 31, a receiver section (speaker) 32, an operating section 33, and an indentation section 34 below the receiver section 32. Attached to the bottom face of the handset 30 is a pair of charging terminals 35.

A charger 40 charges the secondary battery included in the handset 30. A portion of the charger 40 on which the receiver section 32 of the handset is positioned is recessed. A holder section 41 of the charger 40 is formed into the same shape as the rear face of the handset 30. The bottom side of the holder section 41 is provided with conducting terminals 43 with which the charging terminals 35 of the handset 30 are brought into contact. There is a separate protruding piece 42 which is freely attachable to and detachable from a portion of the charger 40 corresponding to the indentation section 34 of the handset 30.

The following description explains the cordless telephone set having the above-mentioned structure, in particular, how the secondary battery in the handset 30 is charged when the charger 40 is used as a desktop charger. In this case, as illustrated in FIG. 6(*a*), when the handset 30 is placed on the charger 40 with its front face down, the receiver section 32 of the handset 30 is positioned to fit into the recessed portion of the holder section 41. When the receiver section 32 fits into the recessed portion, the charging terminals 35 of the handset 30 are in contact with the conducting terminals 43 of the charger 40, thereby charging the secondary battery in the handset 30.

On the other hand, when the handset 30 is placed on the charger 40 with its front face up, as illustrated in FIG. 6(*b*), the rear face of the handset 30 is placed over the portion of the holder section 41 having the same shape as the rear face of the handset 30. At this time, the charging terminals 35 of the handset 30 are brought into contact with the conducting terminals 43 of the charger 40, and the secondary battery in the handset 30 is charged.

Next, how the secondary battery in the handset 30 is charged when the charger 40 is used as a wall charger is explained. As illustrated in FIG. 7, the separate protruding piece 42 is attached to the holder section 41 to stick out toward the recessed portion thereof, and the indentation section 34 of the handset 30 is positioned to engage with the separate protruding piece 42 so as to prevent the handset 30 from dropping from the charger 40. At this time, the charging terminals 35 of the handset 30 come into contact with the conducting terminals 43 of the charger 40, thereby charging the secondary battery in the handset 30.

However, with a conventional apparatus, when the charger is used as a wall charger, it is necessary to provide a separate member in order to prevent the handset from dropping from the charger. Moreover, it is necessary to change the position of the separate member depending on the state of the charger, i.e., whether it is installed on a desk or wall.

As described above, when the charger is used as a desktop charger, the secondary battery is charged by setting the handset on the charger either with its front face down or up. Namely, if the charger is placed on a desk, it is possible to reversibly set the handset on the charger. However, if the charger is mounted on a wall, in order to charge the secondary battery, it is necessary to set the handset on the charger with its front face facing the wall. In other words, the secondary battery can not be charged if the front face of the handset faces outside when the charger is mounted on the wall.

SUMMARY OF THE INVENTION

It is an object of the present invention to provide a cordless telephone set including a charger which is usable either as a desktop charger or a wall charger, and a handset which is reversibly positioned on the charger even when the charger is used as a wall charger.

In order to achieve the above object, a cordless telephone set of the present invention includes: a main telephone connected to a telephone line, a handset connected to the main telephone by radio waves, and a charger for charging a secondary battery included in the handset when the handset is set on the charger, the cordless telephone set being constructed such that the charger is installable either on a desk or a wall and capable of charging the secondary battery without regard to an installation type, wherein the handset includes a first groove and a second groove on both side faces thereof, the first groove having an open end at a front edge of the side face, the second groove having an open end at a rear edge of the side face, and a pair of charging terminals at ends of the first and second grooves opposite the open ends, and wherein the charger has a conducting terminal on both inner side surfaces thereof, the charging terminals fitting into the first or second grooves through the open ends and coming into contact with the charging terminals.

With this structure, when the charger is used as a wall charger, the conducting terminals on the inner side surfaces of the charger fit into the first or second grooves through the open ends and come into contact with the charging terminals at the time of charging the secondary battery in the handset. Moreover, since the conducting terminals engage with the grooves, it is possible to prevent the handset from dropping from the charger.

For a fuller understanding of the nature and advantages of the invention, reference should be made to the ensuing detailed description taken in conjunction with the accompanying drawings.

BRIEF DESCRIPTION OF THE DRAWINGS

FIG. 1(*b*) is a perspective view of a charger for charging a handset shown in FIG. 1(*a*).

FIG. 2(*b*) is a partial cross section of the cordless telephone set, wherein the charger of FIG. 1(*b*) is placed on a desk and the handset is set on the charger with its front face up.

FIG. 4(*b*) is a partial cross section of the cordless telephone set, wherein the charger of FIG. 1(*b*) is mounted on a wall and the handset is set on the charger with its front face facing outside.

FIG. 5(*b*) is a perspective view of a charge for charging the handset of FIG. 5(*a*).

FIG. 6(*b*) is a partial cross section of the cordless telephone set, wherein the charger of FIG. 5(*b*) is placed on a desk and the handset is set on the charger with its front face up.

DESCRIPTION OF THE PREFERRED EMBODIMENTS

The following description discusses an embodiment of the present invention with reference to the accompanying drawings.

Figure 1A:
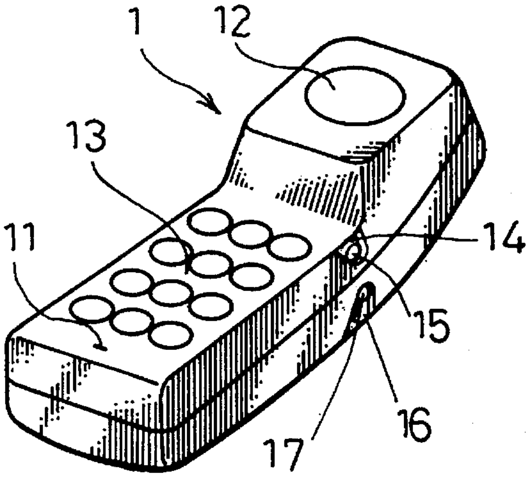
FIG. 1(*a*) is a perspective view of a handset of a cordless telephone set according to one embodiment of the present invention.
Figure 1B:
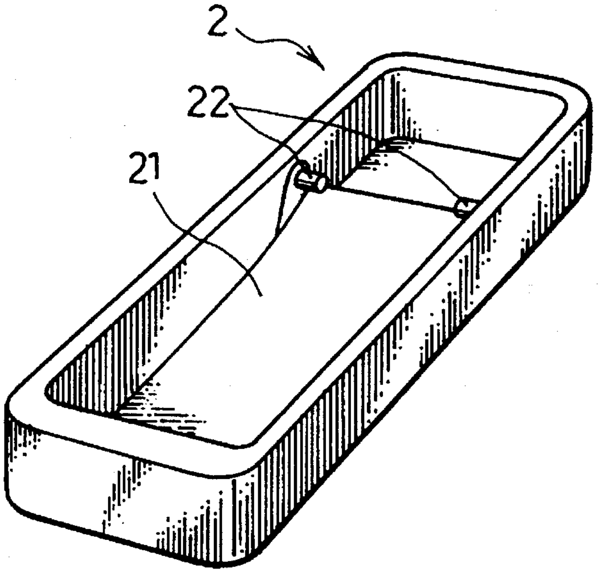
Figure 2A:
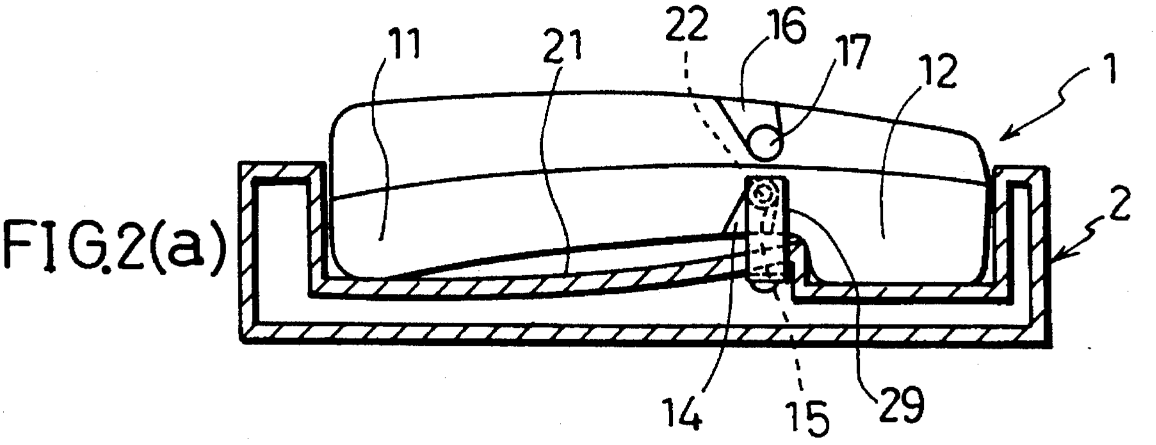
FIG. 2(*a*) is a partial cross section of the cordless telephone set, wherein the charger of FIG. 1(*b*) is placed on a desk and the handset is set on the charger with its front face down.
Figure 2B:
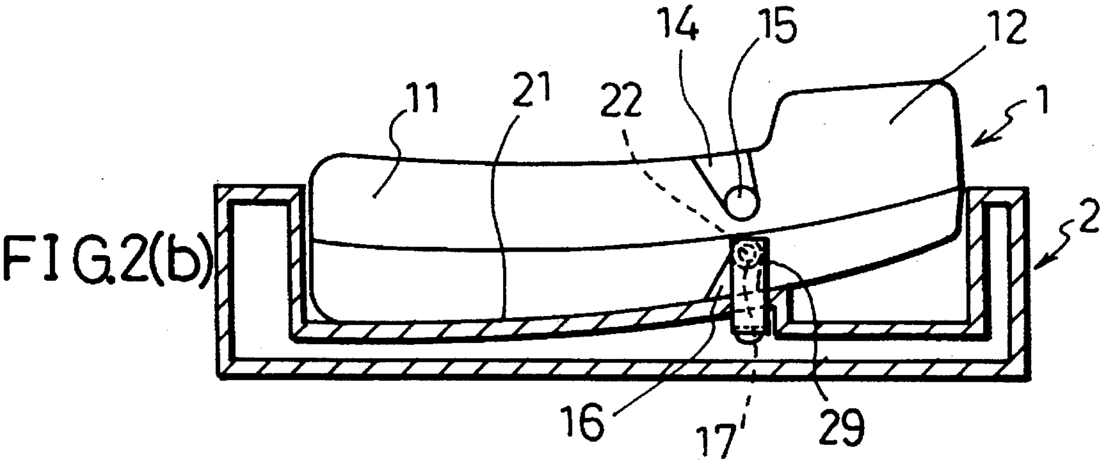
Figure 3:
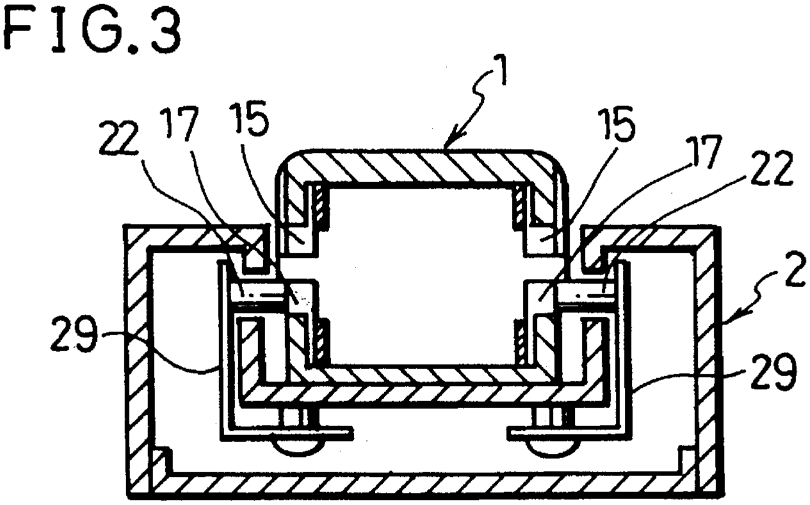
FIG. 3 is a vertical cross section of the cordless telephone set, wherein the handset is set on the charger of FIG. 1(*b*).
Figure 4A:
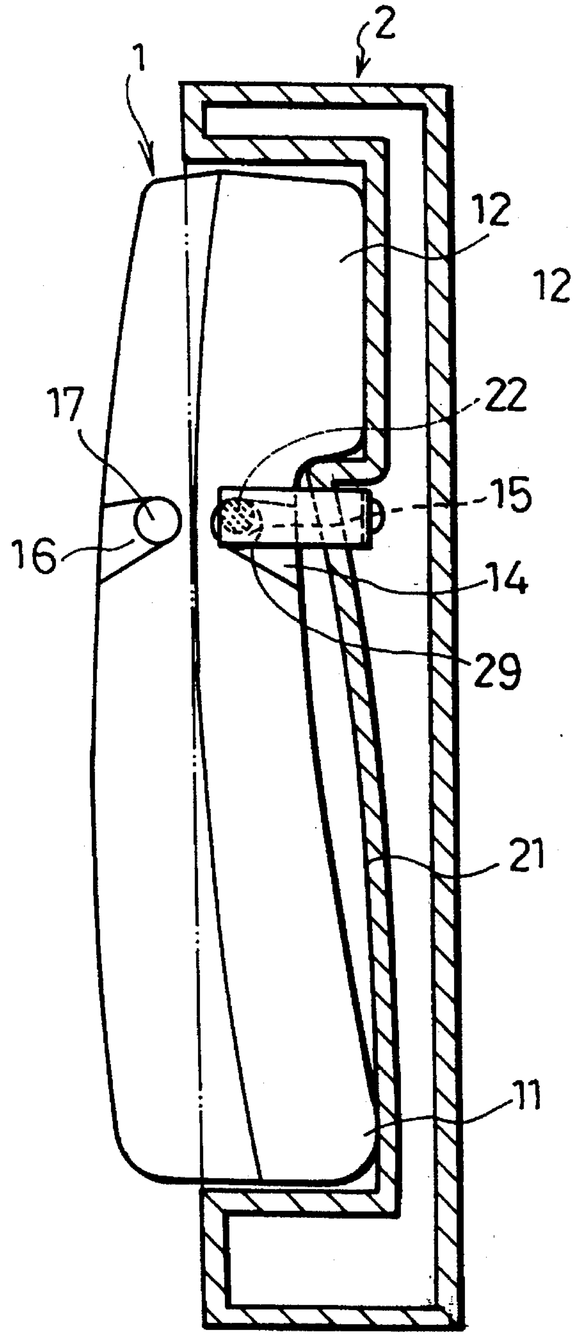
FIG. 4(*a*) is a partial cross section of the cordless telephone set, wherein the charger of FIG. 1(*b*) is mounted on a wall and the handset is set on the charger with its front face facing the wall.
Figure 4B:
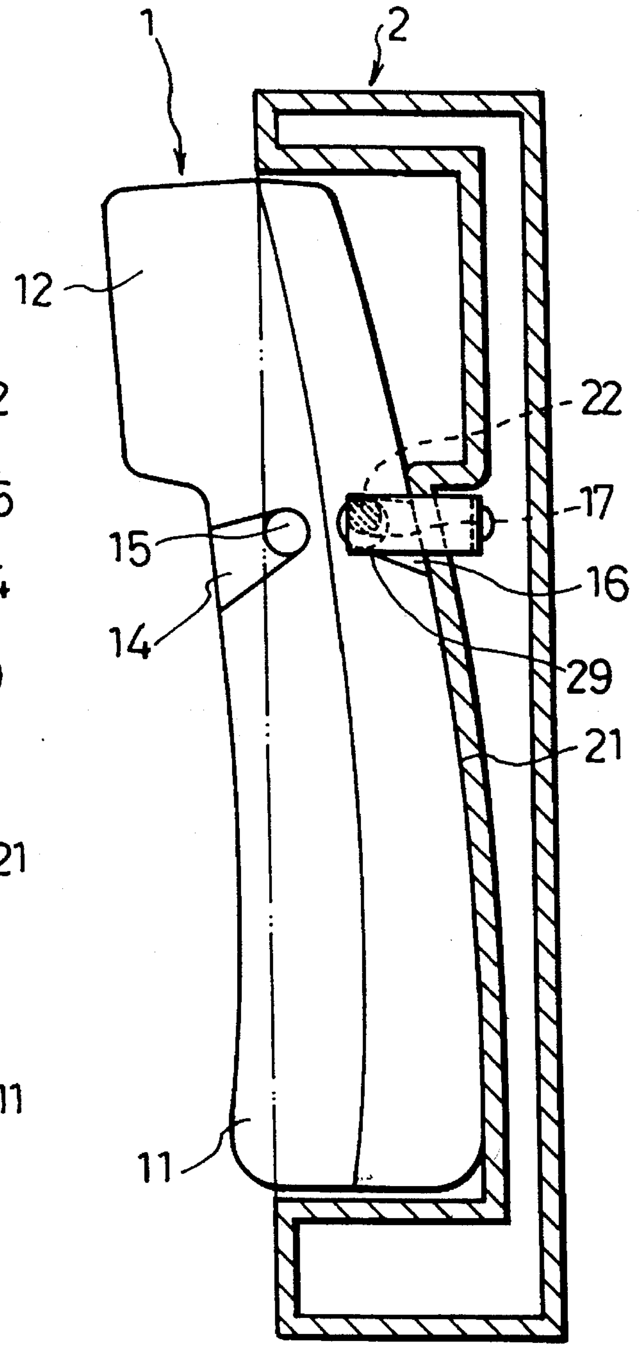
Figure 5A:
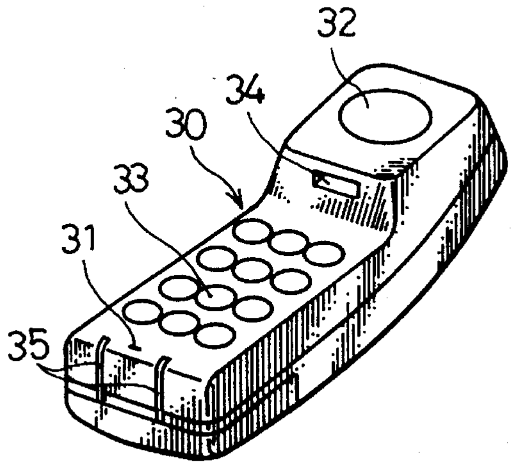
FIG. 5(*a*) is a perspective view of a handset of a cordless telephone set as a conventional example.
Figure 5B:
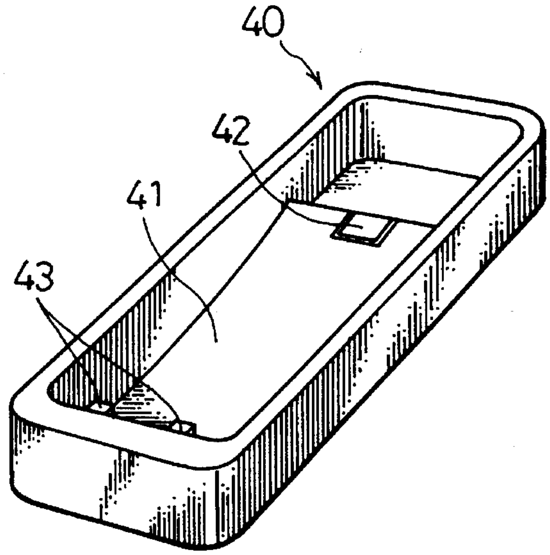
Figure 6A:
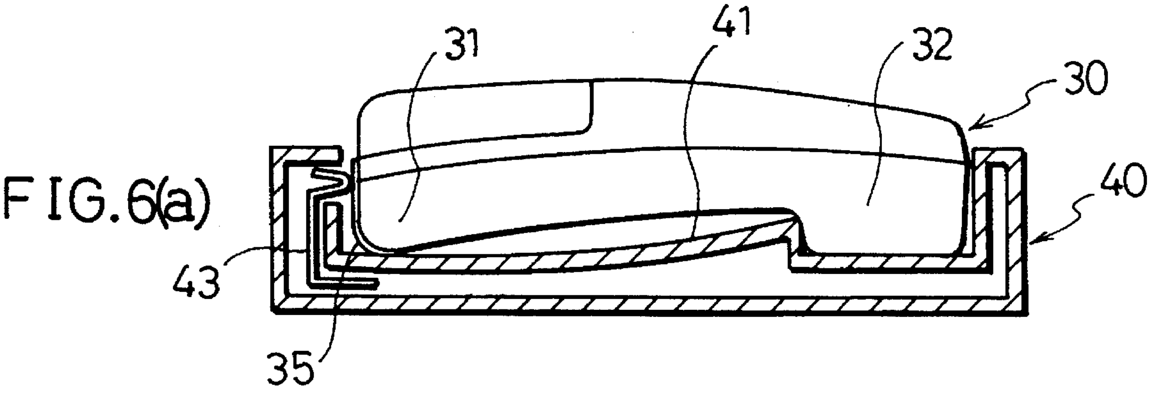
FIG. 6(*a*) is a partial cross section of the cordless telephone set, wherein the charger of FIG. 5(*b*) is placed on a desk and the handset is set on the charger with its front face down.
Figure 6B:
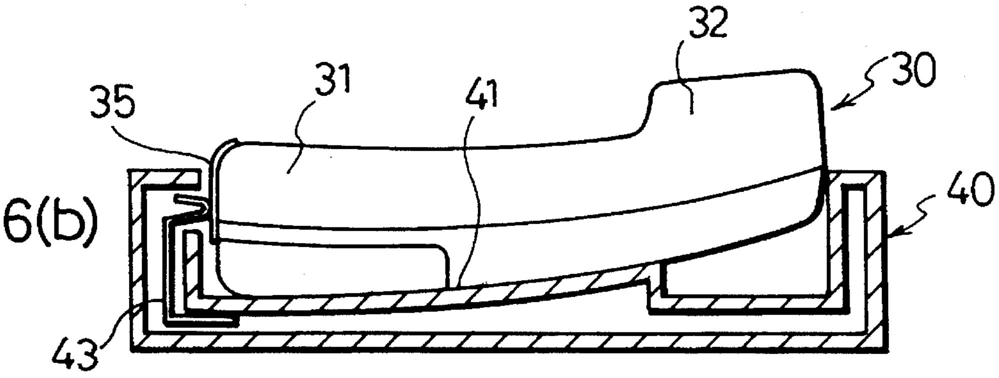
Figure 7:
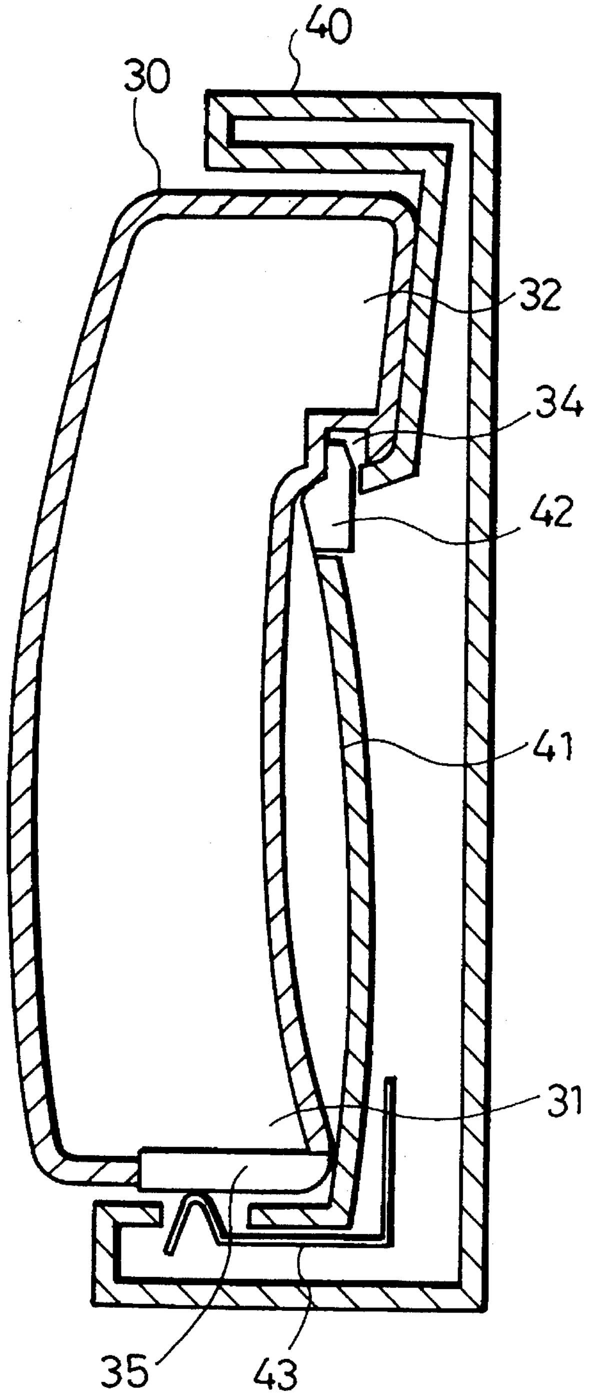
FIG. 7 is a vertical cross section of the cordless telephone set, wherein the charger of FIG. 5(*b*) is mounted on a wall and the handset is set on the charger with its front face facing the wall.

FIGS. 1(*a*) and 1(*b*) are perspective views showing the structure of a handset and a charger of a cordless telephone set according to one embodiment of the present invention. FIGS. 2(*a*) and 2(*b*) are sectional side views showing states in which the handset is set on the charger placed on a desk with its front face down and up, respectively. FIG. 3 is a vertical cross section showing a state in which the handset is placed on the charger. FIGS. 4(*a*) and 4(*b*) are sectional side views showing states in which the handset is placed on the charger mounted on a wall so that its front face faces the wall and outside, respectively.

In these figures, 1 represents the handset of the cordless telephone set having therein a secondary battery. The handset 1 includes a transmitter section 11, a receiver section 12, and an operating section 13 on the front face thereof. There are two grooves 14 and 16 on both the side faces of the handset 1, respectively. Each of the grooves (first grooves) 14 has a width which increases toward the front edge of the side face, and a charging terminal 15 on an end thereof nearer to the center of the side face. On the other hand, each of the grooves (second grooves) 16 has a width which increases toward the rear edge of the side face, and a charging terminal 17 on an end thereof nearer to the center of the side face.

As illustrated in FIG. 3, the groove 14, the charging terminal 15, the groove 16, and the charging terminal 17 are symmetrically provided on each of the side faces of the handset 1.

In these figures, 2 represents a charger for charging a secondary battery included in a handset 1. The charger 2 has a holder section 21. A portion of the holder section 21 on which the receiver section 12 of the handset 1 is placed is recessed. Except for this portion, the holder section 21 has the same shape as that of the rear face of the handset 1. A conducting terminal 22 is attached to both the inner side surfaces of the holder section 21 so that the conducting terminals 22 engage with the grooves 14 and come into contact with the charging terminals 15 when the handset 1 is placed on the charger 2 with its front face down, or that they engage with the grooves 16 and come into contact with the charging terminals 17 when the handset 1 is placed on the charger 2 with its front face up.

The conducting terminals 22 are mounted near the ends of L-shaped resilient metal parts 29, and press the charging terminals 15 when the handset 1 is placed on the charger 2.

With the cordless telephone set having the above-mentioned structure, when the charger 2 is used as a desktop charger and when the handset 1 is placed on the charger 2 with its front face down, the secondary battery is charged as follows. As illustrated in FIG. 2(*a*), the handset 1 is positioned on the charger 2 so that the receiver section 12 of the handset 1 fits into the recessed portion of the holder section 21 and that the charging terminals 15 of the handset 1 are brought into contact with the conducting terminals 22 on the inner side surfaces of the holder section 21 by fitting the conducting terminals 22 into the grooves 14 through the open ends. When these terminals 22 and 15 come into contact with each other, the secondary battery in the handset 1 is charged.

Meanwhile, when the charger 2 is used as a desktop charger and when the handset 1 is placed on the charger 2 with its front face up, the secondary battery is charged as follows. As illustrated in FIG. 2(*b*), the handset 1 is positioned on the charger 2 so that the rear face thereof is placed over the portion of the holder section having the same shape as that of the rear face of the handset 1. At this time, the conducting terminals 22 on the inner side surfaces of the holder section 21 fit into the grooves 16 through the open ends, and are in contact with the charging terminals 17 of the handset 1. When these terminals 22 and 17 come into contact with each other, the secondary battery in the handset 1 is charged.

In short, if the charger 2 is used as a desktop charger, charging of the secondary battery in the handset 1 is carried out when the handset 1 is placed on the charger 2 either with its front face down or up. Namely, it is possible to reversibly set the handset 1 on the charger 2.

Next, the following description explains how the secondary battery in the handset 1 is charged when the charger 2 is mounted on a wall and when the handset 1 is placed on the charger 2 with its front face facing the wall. As illustrated in FIG. 4(*a*), the receiver section 12 of the handset 1 is positioned to fit into the recessed portion of the holder section 21, and the charging terminals 15 of the handset 1 are brought into contact with the conducting terminals 22 on the inner side surfaces of the holder section 21 of the charger 2 while fitting the conducting terminals 22 into the grooves 14 through the open ends. When these terminals 22 and 15 come into contact with each other, the secondary battery in the handset 1 is charged. At this time, the conducting terminals 22 are held at the ends of the grooves 14 opposite the open ends to stop the handset 1 from dropping from the charger 2.

Meanwhile, when the charger 2 is mounted on a wall and when the handset 1 is placed on the charger 2 so that its front face comes outside, the secondary battery is charged as follows. As illustrated in FIG. 4(*b*), the handset 1 is positioned on the charger 2 so that the rear face of the handset 1 is placed over the portion of the holder section 21 having the same shape as that of the rear face of the handset 1 and that the charging terminals 17 of the handset 1 are brought into contact with the conducting terminals 22 on the inner side surfaces of the holder section 21 while fitting the conducting terminals 22 into the grooves 16 through the open ends. When these terminals 22 and 17 come into contact with each other, the secondary battery in the handset 1 is charged. At this time, the conducting terminals 22 are held at the ends of the grooves 16 opposite the open ends to stop the handset 1 from dropping from the charger 2.

Thus, when the charger 2 is used as a wall charger, it is possible to charge the secondary battery in the handset 1 even if the handset 1 is reversibly positioned on the charger 2. Namely, charging of the secondary battery is available irrespective of whether the front face of the handset 1 faces the wall or outside. Moreover, this structure prevents the handset 1 from dropping from the charger 2 without using a separate member for holding the handset 1 on the charger 2.

As described above, the present invention enables charging by positioning the front face of the handset to face down or the wall while fitting the conducting terminals of the charger into the first grooves through the open ends formed at the front edges of the side faces of the handset and bringing a pair of charging terminals located at the ends of the first grooves opposite the open ends into contact with the conducting terminals. Moreover, the present invention enables charging by positioning the front face of the handset to face up or outside while fitting the conducting terminals of the charger into second grooves through the open ends formed at the rear edges of the side faces of the handset and bringing the pair of charging terminals located at the ends of the second grooves opposite the open ends into contact with the conducting terminals. Furthermore, when the charger is mounted on a wall, the above-mentioned structure prevents the handset from dropping from the charger as the first or second grooves engage with the conducting terminals. It is therefore not necessary to provide a separate piece for preventing the handset from dropping from the charger. Additionally, with such a simplified structure of the present invention, when the charger is used as a wall charger, charging of the secondary battery is performed even if the handset is reversibly set on the charger.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cordless telephone set comprising:

a main telephone connectable to a telephone line, a handset connectable to said main telephone by radio waves, a charger for charging a secondary battery located in said handset when said handset is placed on said charger, wherein said handset includes two side faces, with a first pair of grooves on one side face and a second pair of grooves on the other side face, each of said pair of grooves having one groove having an open end at a front edge of each one of said side faces, with the second groove of each pair having an open end at a rear edge of each of one of said side faces, charging terminal located in each of the grooves opposite said open ends, and wherein said charger includes inner side surface with a conducting terminal on each of the inner side surfaces, said conducting terminals fitting into grooves facing said front edge or said rear edge through said open ends and coming into contact with charging terminals located in the grooves, when a front or rear surface of said handset is placed on the charger.

2. The cordless telephone set according to claim 1, wherein said conducting terminals of said charger press said charging terminals of said handset placed on said charger.

3. The cordless telephone set according to claim 2, wherein said charger has L-shaped metal parts for pressing said conducting terminals against said charging terminals.

* * * * *